United States Patent
Borgstrom

(10) Patent No.: US 6,726,885 B2
(45) Date of Patent: Apr. 27, 2004

(54) OZONE GENERATOR AND A METHOD FOR GENERATION OF OZONE

(75) Inventor: Jan Borgstrom, Landskrona (SE)

(73) Assignee: Ozonator Limited, Jersey (GB)

( * ) Notice: Subject to any disclaimer, the term of this patent is extended or adjusted under 35 U.S.C. 154(b) by 353 days.

(21) Appl. No.: 09/946,319

(22) Filed: Sep. 5, 2001

(65) Prior Publication Data

US 2002/0006366 A1 Jan. 17, 2002

Related U.S. Application Data

(63) Continuation-in-part of application No. PCT/SE00/00438, filed on Mar. 3, 2000.

(30) Foreign Application Priority Data

Mar. 5, 1999 (SE) .......................................... 9900781-7

(51) Int. Cl.[7] .............................................. B01J 19/08
(52) U.S. Cl. ............................................... 422/186.07
(58) Field of Search .................................... 422/186.07

(56) References Cited

U.S. PATENT DOCUMENTS

| | | | |
|---|---|---|---|
| 3,973,113 A | 8/1976 | Goldsamt ..................... 235/156 |
| 4,034,229 A | 7/1977 | Grossen et al. .............. 250/541 |
| 4,307,433 A | 12/1981 | Takechi et al. .............. 361/231 |
| 4,545,960 A | 10/1985 | Erz et al. ..................... 422/186 |
| 4,869,881 A | 9/1989 | Collins ......................... 422/186 |
| 4,960,570 A | 10/1990 | Mechtersheimer ........... 422/186 |
| 5,008,087 A | 4/1991 | Batchelor .................... 422/186 |
| 5,211,919 A | 5/1993 | Conrad ........................ 422/186 |
| 5,354,541 A | 10/1994 | Sali et al. .................... 422/186 |
| 5,366,702 A | 11/1994 | Rimpler ................... 422/186.07 |
| 5,417,936 A | 5/1995 | Suzuki et al. ................ 422/186 |
| 5,435,978 A | 7/1995 | Yokomi ........................ 422/186 |
| 5,516,493 A | 5/1996 | Bell et al. .................... 422/186 |
| 5,529,760 A | 6/1996 | Burris .......................... 422/186 |
| 5,538,695 A | 7/1996 | Shinjo et al. ................. 422/186 |
| 5,554,345 A | 9/1996 | Kitchenman ................. 422/186 |
| 5,770,168 A | 6/1998 | Carlsten et al. .............. 422/186 |
| 5,879,641 A | 3/1999 | Conrad et al. ............... 422/186 |
| 5,932,180 A | 8/1999 | Zhang et al. ................ 422/186 |
| 5,942,196 A | 8/1999 | Tabata et al. ................ 422/186 |
| 5,950,065 A | 9/1999 | Arlemark ..................... 422/186 |

FOREIGN PATENT DOCUMENTS

| | | |
|---|---|---|
| EP | 0 679 608 A2 | 2/1995 |
| EP | 0 830 312 | 2/1996 |
| FR | 2 246 492 | 10/1974 |

(List continued on next page.)

OTHER PUBLICATIONS

Article entitled "High Density Ozone Generation In A Very Narrow Gap By Silent Discharge," M. Kuzumoto et al of Mitsubishi Electric Corp., pp. 51–58.

(List continued on next page.)

*Primary Examiner*—Kishor Mayekar
(74) *Attorney, Agent, or Firm*—Boyle Fredrickson Newholm Stein & Gratz, S.C.

(57) ABSTRACT

An apparatus and method for ozone generation and a method for generating ozone by exposing oxygen to high frequency alternating current with high voltage over a dielectric. The apparatus comprises a pressure compensation admitting unit joined together by at least two plates of a dielectric material and therebetween a present electrode on which high frequency alternating current with high voltage is applicable, and two sealed spaces for generation of ozone on opposite sides of the unit, whereby the respective sealed space, on the opposite side of said plate of dielectric material, is delimited by an earthed and cooled electrode, through which oxygen gas or gas rich in oxygen is supplied to the space and ozone is conducted out of the same. By means of this apparatus, oxygen gas or gas rich in oxygen can be conducted under pressure into sealed chambers on opposite sides of the pressure compensation admitting unit.

24 Claims, 5 Drawing Sheets

FOREIGN PATENT DOCUMENTS

| | | |
|---|---|---|
| HU | 216043 B | 4/1999 |
| JP | 5506751 | 5/1980 |
| JP | 62278105 | 12/1987 |
| JP | 7187609 | 7/1995 |
| JP | 7187610 | 7/1995 |
| JP | 724403 | 9/1995 |
| JP | 10029806 | 2/1996 |
| JP | 8245203 | 9/1996 |
| JP | 9255308 | 9/1997 |
| JP | 11209105 | 8/1999 |

OTHER PUBLICATIONS

Article entitled "Development of Ultra–High Concentration Ozone Generator" by K. Hirosc et al of Mechatronics Development Center, pp. 177–183; $14^{th}$ Ozone World Congress, Dearborn Michigan, USA, Aug. 25, 1999.

English Language Abstract for FR2594108, entitled: "Ozoniser" with one drawing figure, by Fujii.

English Language Abstract for JP10029806, entitled: "Ozone Generating Device" with one drawing figure, by Fujii.

English Language Abstract for JP11209105, entitled: "Ozone Generator For Sewage Water Treatment" with one drawing figure by Ieda et al.

English Language Abstract for JP55067510, entitled: "Silent Discharge Type Ozoniser" with one drawing figure by Takahashi et al.

English Language Abstract for JP62278105, entitled: "Ozone Generator For Increased Efficiency of Ozone Generation" with one drawing figure by Noda.

English Language Abstract for JP7187609, entitled: "Ozoniser Having Improved Ozone–Generating Efficiency" with one drawing figure by Kubota.

English Language Abstract for JP7242403, entitled: "Silent Discharge Type Ozoniser For Treating Water or Raw Sewage" with one drawing by Suwahara et al.

English Language Abstract for JP8245203, entitled: "Ozone Prodn Appts" with one drawing figure by Yagi et al.

English Language Abstract for JP9255308, entitled: "Generation Of Ozone" with one drawing figure by Ishioka.

English Language Abstract for JP7187610, entitled: Double–Tube Ozoniser Having Greater Efficiency with one drawing figure by Ishioka.

OZONE GENERATOR AND A METHOD FOR GENERATION OF OZONE

CROSS-REFERENCE TO RELATED APPLICATION

This application is a continuation-in-part of presently copending international application serial number PCT/SE00/00438, filed Mar. 3, 2000, which claims priority in Swedish application serial number SE 9900781-7, filed Mar. 5, 1999.

FIELD OF THE INVENTION

The present invention relates to an ozone generator and a method for generating ozone by exposing oxygen to a high frequency alternating current with high voltage over a dielectric.

BACKGROUND OF THE INVENTION

Ozone has strongly oxidizing features and is used, preferably diluted, to sterilize water. For example may wastewater be treated for purpose of breaking down or eliminating substances dangerous for the environment or the health as well as unpleasant smells from the water, and the drinking water may be pre-treated for purpose of improving the water quality. Other fields of application are e.g. as bleaching agent in the paper industry, for air purification purposes, and to perform certain oxidizing reaction in organic chemistry.

Ozone mixed with oxygen is produced by passing oxygen gas or gas rich in oxygen through an electric discharge. Oxygen gas or gas rich in oxygen is thereby made to flow through a chamber in an ozone generator or ozonizer, which chamber either is delimited by two tubes having the same axis or by plates in series, between which an electric discharge occurs. In this description the expressions space and chamber are used as representing the same, i.e. the place in the ozone generator where existing oxygen gas or gas rich in oxygen is converted to ozone.

The first mentioned type of ozone generator is for industrial purpose very large and space demanding and also difficult and expensive to produce and maintain. The second type of ozone generator is more economic and less space demanding, but has still certain sealing and strength problems and does not operate optimally.

A problem related to ozone generators is connected to that the chamber in which the oxygen in the form of oxygen gas or gas rich in oxygen is converted to ozone at least has one delimiting surface constituted of a dielectric material, a dielectric. This dielectric is utilized for the purpose of generating a corona at the discharge between a high voltage electrode and earth, and is generally composed of a ceramic or a glass material. High gas pressures and not the least pressure variations in the gas supplied to the chamber, for example caused by pressure shocks in the system when the gas supply is engaged or disengaged, generates high stresses on the ceramic with the consequence of the ceramic risking to crack.

Another problem is related to the sealing required between said dielectric and the opposite delimiting surface of the chamber, which opposite surface generally constitutes electric earth. This sealing is exposed to the influence of high gas pressure and pressure shocks. In addition the sealing is a problem for the useful life and the reliability of the ozone generator since ozone is particularly reactive, whereby common rubber gaskets tend to break down and cause leakage.

Concrete exemplary embodiments of ozone generators have been described in a manifold of publications, i.a. in the following:

In U.S. Pat. No. 5,354,541 A1 is thus a tubular ozone generator described comprising i.a. a helical spring electrode 12, a tube 14 of dielectric material surrounding the electrode 12 and also a tubular, earthed and cooled second electrode 15. Between the second electrode 15 and the tube 14 is an annular chamber 16 for ozone generation delimited. Supply of oxygen to the only annular chamber 16 for ozone generation occurs one-sided, whereby in the beginning also the pressure influence is one-sided. During operation a pressure influence is continuously present from the outside against the tube 14, and this pressure influence varies instantaneously by pressure shocks, which may occur during the operation. Altogether this causes major stresses on the construction and major risk for damages and leakage.

In U.S. Pat. No. 4,960,570 A1 a complex and material demanding ozone generator is described with i.a. tubes 3,8 of a dielectric material, alternatively tubes having an outer coating of dielectric material. The tubes 3,8 have internally a metallic film 4 constituting one electrode, alternatively show a separate electrode 10 inside the tubes 3. The tubes 3 are located between two flat external electrodes 1,2, which are cooled. Spaces or chambers 6 and 11, respectively, for ozone generation are found between the tubes 3 and the plate electrodes 1,2, and possibly also in the tubes 3 between the inside of the tubes and the electrode 10 therein. It is not evident from the publication how the spaces 6, between the details 3,8 of dielectric material and the cooled electrodes 1,2, are supplied with oxygen for ozone generation, and consequently nor how these details are affected by the pressure from the supplied oxygen or by pressure shocks arising during operation.

Through WO, A1 9701507 an ozone generator is known, which comprises two plates 2 of a dielectric material, and between them is a thread or net shaped electrode 3 located, over which electrode 3 is a high frequency alternating current with high voltage is applied and, on the outside of the plates 2, earthed and cooled electrodes 4. A space for ozone generation is delimited between the plates 2 and a frame 3'. The ozone generator is, from the inside of the space for ozone generation, exposed to pressure influence, whereby the plates 2 tend to separate. Instantaneously, at pressure shocks, this pressure influence may increase. Major risks for damages and sealing problems for the ozone generator exists. There are no spaces for ozone generation outside the plates 2.

In U.S. Pat. No. 5,435,978 A1 is finally also a flat ozone generator with two electrodes 1 described, which intermediately form a space 2 for ozone generation. On the respective electrode 1 a layer of dielectric material is applied. In order to compensate the pressure in the internal space 2 for ozone generation, an external pressure is applied on the ozone generator by locating it in a pressure vessel, in which a gas under pressure is supplied. Instantaneous pressure differences due to pressure shocks, which occur during operation of the ozone generator, are however hard to handle. The risk for damages is large at these occasions. Yet another ozone generator design is shown in "High Density Ozone Generation In a Very Narrow Gap By Silent Discharge" by M. Kuzumoto, Y. Tabata and S. Yagi, Mitsubishi Electric Corporation, from the 12$^{th}$ World Ozone Congress, May 15–18, 1995, Lille, France, Vol. 2, pages 51–58. The proposed design discloses a thin circular one-sided discharge chamber between a ceramic plate and an earth electrode. Gas inlets to the chamber are arranged in the periphery of the chamber, while an outlet is arranged in the center of the chamber through a hole in the earth electrode. The ceramic plate rests, on the opposite side of the chamber, against a stress buffering plate of unknown kind, which in its turn is adjacent to a metal plate. Towards the stress buffering plate the ceramic plate is coated with a metal layer, which forms a high voltage electrode. The depth of the chamber is defined by a metal spacer located therein and comprises radially extending support element.

PURPOSE WITH THE INVENTION

A purpose with the present invention is to provide an ozone generator and a method for ozone generation, which overcomes the problems with the prior art. An aspect of this purpose is to use a simple, compact and less costly design to increase the power and improve the conversion efficiency compared to known ozone generators, and moreover to prevent components of the apparatus to be damaged or to deteriorate in efficiency due to the overpressure of supplied gas and due to pressure shocks arising during the operation of the apparatus.

A further aspect of this purpose is to provide a design, which gives a uniform pressure distribution over the delimiting surfaces of the gas chamber.

Another aspect of this purpose is to provide a design that is adapted to protect a sealing, arranged between a dielectric and an opposite delimiting surface, from wear as a consequence of the reactive action of the ozone.

SUMMARY OF THE INVENTION

According to a first aspect of the present invention an ozone generator B referred to, for these purposes comprising a unit, in which unit a high voltage electrode and an electrically isolating element, preferably a dielectric element, are joined, and a chamber which is delimited by said dielectric element and by an earth electrode. The invention is, according to the first aspect, characterized by the ozone generator being arranged to operate with pressure equilibrium, whereby a pressure change in said chamber is arranged to act with equal force on opposite sides of said unit.

According to a second aspect of the invention an ozone generator is referred to, comprising a high voltage electrode, and also a first and a second dielectric element, arranged on opposite sides of said high voltage electrode. These dielectric elements are on opposite sides of said high voltage electrode arranged in sealed connection with a first and a second earth electrode, respectively, whereby the respective earth electrodes are arranged to delimit a first and a second sealed chamber, respectively, towards said first and second dielectric element, respectively. More specifically according to a third aspect of the invention, an ozone generator is thus referred to, wherein a high voltage electrode is located centrally between two uniform sealed chambers, and wherein each one of the chambers on one side is delimited from said high voltage electrode by a dielectric, and on another side by an earth electrode. With this arrangement the ozone generators sensitive dielectric element is exposed to equal gas pressure and gas pressure variations from opposite sides, whereby the pressure is equalized.

According to a fourth aspect an ozone generator is referred to, comprising a high voltage electrode and a dielectric, which dielectric delimits a sealed chamber to an opposite wall with an intermediate endless sealing. According to the fourth aspect, the invention is characterized by a recess being formed in an outer part of the chamber, endlessly extending adjacent said sealing, in which recess an inlet to said chamber emerges, whereby the chamber presents a larger depth in said recess than in its central part. Preferably an outlet from said chamber, intended for output of ozone, is arranged with an orifice at the central part of the chamber. With this arrangement the supplied oxygen gas or gas rich in oxygen is made to first fill said recess, in which the smallest resistance for the gas to diffuse is provided, and thereafter to diffuse towards the central parts of the chamber. With a uniform gas flow, which flow due to the locations of the inlet and outlet is directed from the periphery of the chamber to its center, oxygen which first fills the chamber close to the sealing will protect the same from the ozone generated in the chamber.

According to a preferred embodiment of the present invention the ozone generator comprises a pressure compensation admitting unit, which has been joined together with at least two plates of a dielectric material and an electrode present between said plates, on which electrode a high frequency alternating current with high voltage is applicable, and two sealed spaces for ozone generation on opposite sides of said unit, whereby the respective sealed space, on the side opposite the plate of dielectric material, is delimited by an earthed and cooled electrode, via which oxygen gas or gas rich in oxygen is supplied to the space and ozone is conducted away from the same.

By this arrangement a compact design with minor space requirements is obtained, still having high efficiency without damage or sealing problems at e.g. the unit comprising the plates of dielectric material and the electrode on which a high frequency alternating current with high voltage is applicable, since this unit at the same time is influenced by an overpressure and pressure shocks from two opposite sides, respectively, and by its form moreover forces these overpressures and pressure shocks, respectively, to compensate, i.e. equalize, each other. The compensation of said overpressure and pressure shocks, respectively, which may originate during operation of the apparatus gives stability to the apparatus and thereby an increased conversion efficiency for the same.

The present invention also refers, according to a fifth aspect, to a method for ozone generation comprising the steps of supplying oxygen or gas rich in oxygen to a first chamber, and applying a high frequency alternating current with high voltage to a high voltage electrode for the purpose of causing a discharge in the first chamber over a dielectric to an earth electrode. The method is characterized by pressure changes in the supplied gas being compensated by the gas pressure being forced to operate to the same extent on opposite sides of a compact unit comprising said dielectric. By compact is here meant that the included components in the unit between themselves are in mechanical connection without any intermediate spaces, whereby the unit substantially constitutes a non-compressible body.

More exactly, according to a sixth aspect of the present invention, a method for ozone generation is referred to comprising the steps of oxygen gas or gas rich in oxygen under pressure being conducted from a common source into two uniform sealed chambers, which chambers are delimited from each other by a unit, which unit comprises two dielectric elements and between them a high voltage electrode, a high frequency alternating current with high voltage being applied on said high voltage electrode, existing oxygen in the chambers thereby being converted to ozone by electric discharges between said high voltage electrode and separate earth electrodes, where each earth electrode respectively delimits one chamber, respectively, on opposite side of the respective dielectric element.

BRIEF DESCRIPTION OF THE DRAWINGS

Further advantages with and characterizing features of the apparatus for ozone generation according to the present invention are described thoroughly below with references to the accompanying drawings, in which.

DETAILED DESCRIPTION OF PREFERRED EMBODIMENTS

Figure 1:
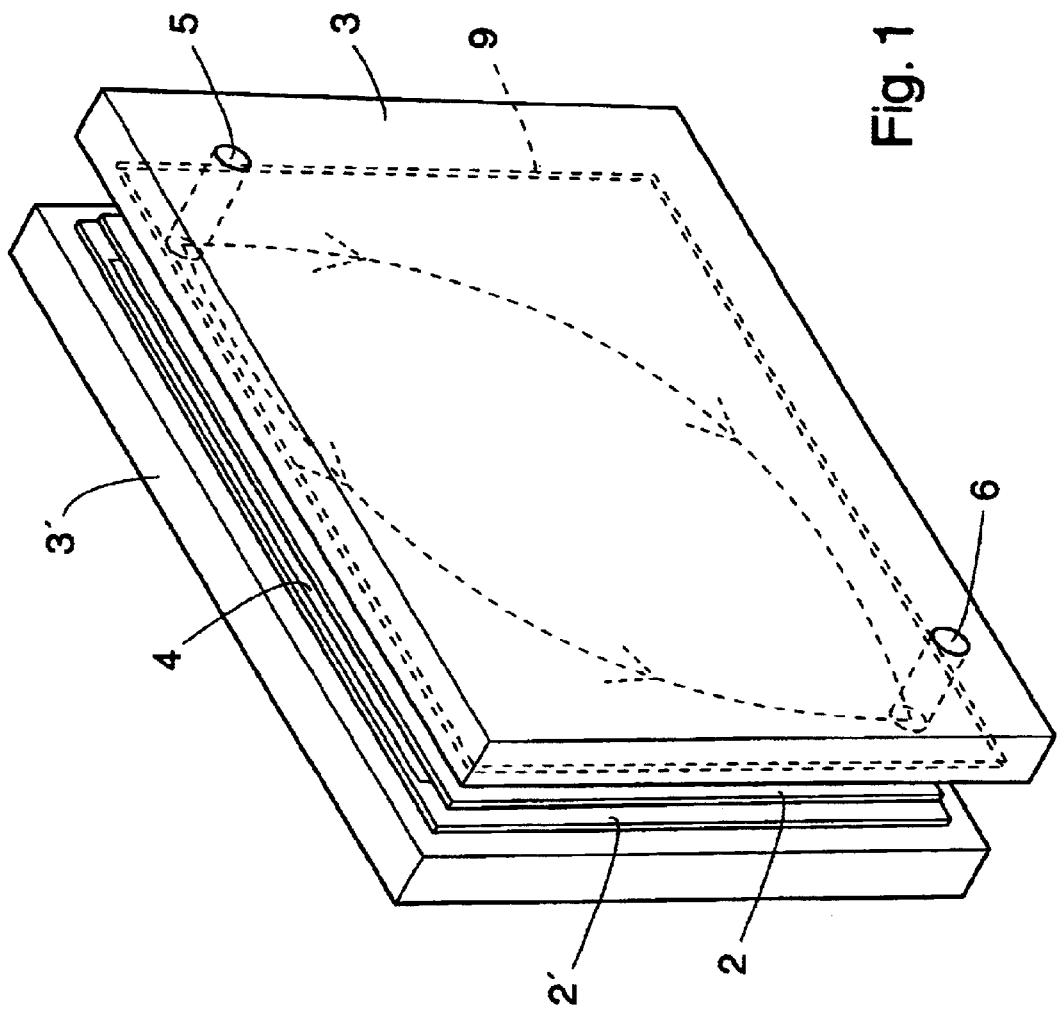
FIG. 1 shows a schematic perspective view of a first preferred embodiment of an ozone generator according to the present invention.
Figure 2:
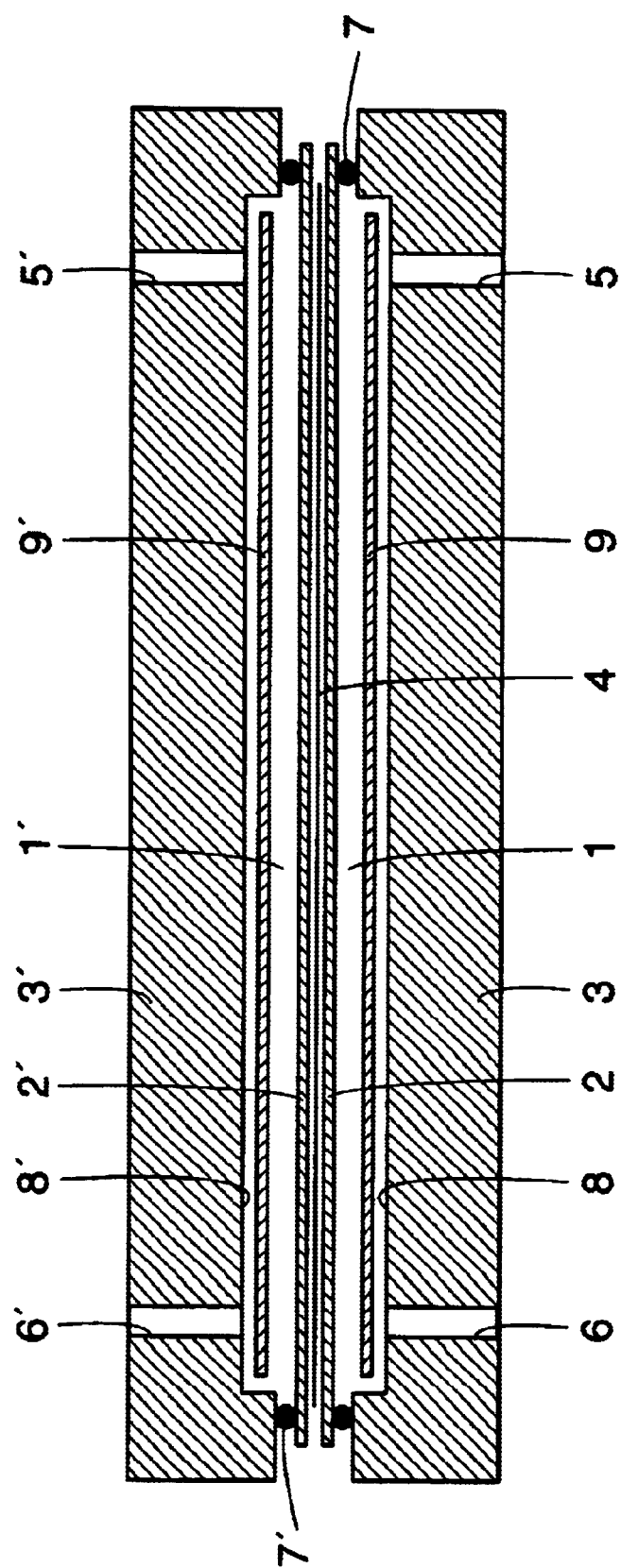
FIG. 2 shows a schematic longitudinal sectional view of an ozone generator according to FIG. 1.

With reference to the FIGS. 1 and 2 an apparatus for ozone generation, an ozone generator or ozonizer, is thus schematically shown in a first preferred embodiment.

As is evident from especially FIG. 2 a sealed space or a chamber 1 for ozone generation in said apparatus for ozone generation is on one side delimited by a plate 2 of dielectric material, preferably a ceramic, glass or similar, and on the opposite side by an earthed and cooled electrode 3 of e.g. aluminum, stainless steal or the like, preferably aluminum due to its good thermal conductivity. An electrode 4 of e.g. aluminum, copper or another electric conductive material and on which a high frequency alternating current with high voltage is applicable, is arranged on the opposite side of the plate 2 of dielectric material as said sealed space/chamber 1. The plate 2 of dielectric material and the respective electrodes 3,4 all present suitable size and shape for the referred purpose. The mentioned details of the presented embodiment are e.g. shaped as four-sided, almost quadratic plates, but the plates, or the like, may also be rectangular, circular, three-sided, five-sided, six-sided and so on.

In order to design an ozone generator in a simple and cost-effective way, in accordance with the invention, having double effect, a second plate 2' of dielectric material is arranged on the opposite side of the electrode 4, on which electrode 4 a high frequency alternating current with high voltage is applicable, as the first plate 2 of dielectric material. The electrode 4, preferably in the form of a foil or a metal sheet, is suitably clamped between the plates 2,2' of dielectric material, or e.g. screen printed on one or both plates 2,2' forming a kind of coating thereon, but may also be of another suitable design, for example having the shape of a plate as in the drawings in FIGS. 1 and 2. Required couplings for connection to an alternating current source are not shown. Irrespective of the embodiment of the electrode 4 a compact unit requiring little space, a "packet", is provided according to the invention, composed of the electrode 4 and the two plates 2,2' of dielectric material, with the capability to resist, absorb two external pressures acting counter-directed thereupon, and to force these pressures to compensate, equalize, each other. The second plate 2' of dielectric material delimits, together with a second earthed and a cooled electrode 3', located opposite said second plate 2', a second sealed space 1' for ozone generation.

Figure 5:
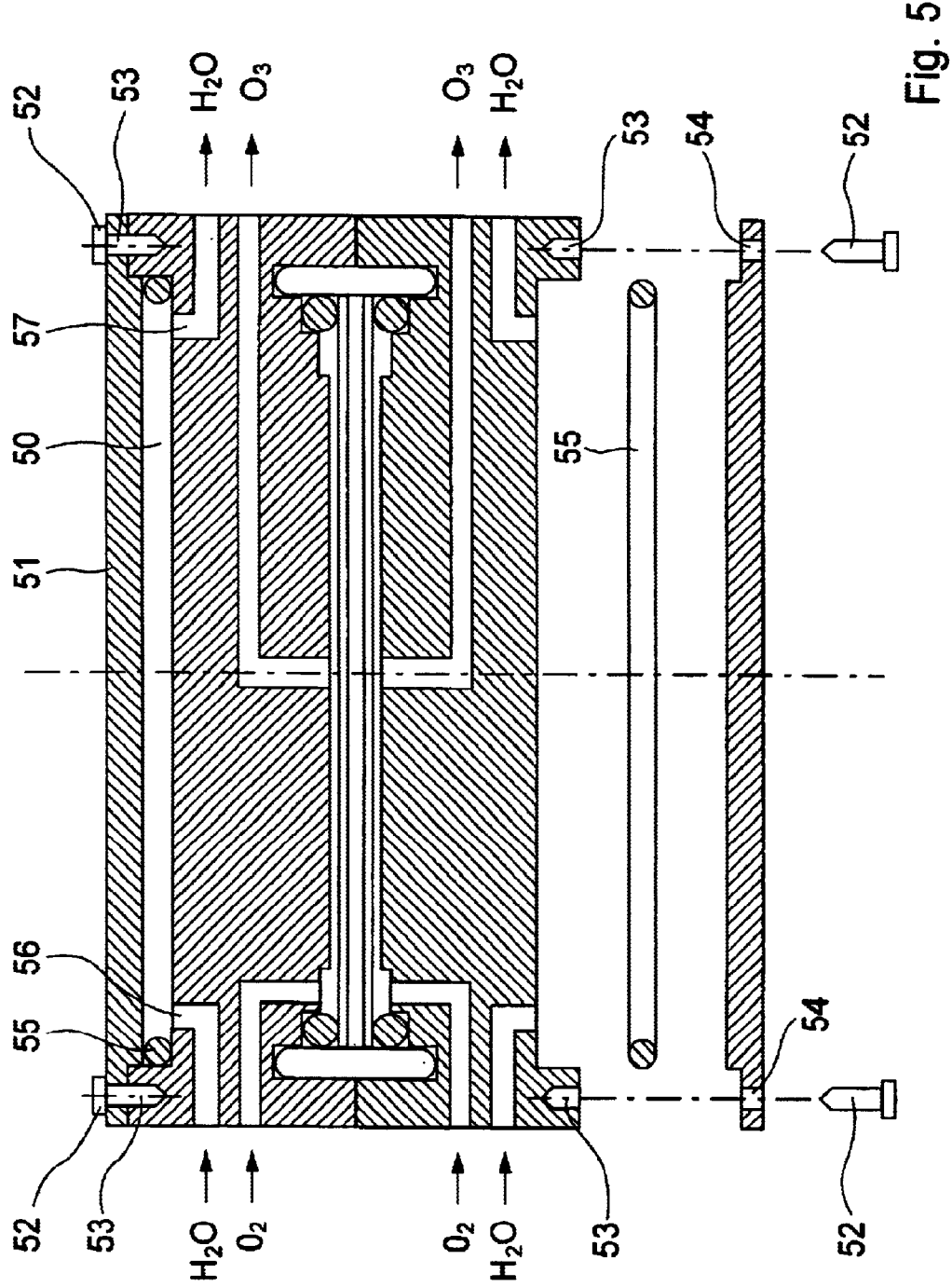
FIG. 5 shows schematically a cross-sectional view of a third embodiment of the present invention, including the features of FIGS. 3 and 4 and further disclosing means for cooling the apparatus.

Each earthed and cooled electrode 3,3' is constituted by an earthed block, preferably of one of the above-mentioned metals, and includes a cooling medium or shows ducts for a cooling medium in order to achieve required cooling thereof during operation (the cooling ducts are shown in the embodiment illustrated in FIG. 5). In each earthed and cooled electrode 3,3', i.e. in said metal block are further inlet and outlet means formed, preferably inlet passages 5,5' for supply of oxygen gas or gas rich in oxygen to respective sealed spaces 1,1', and respective outlet passages 6 and 6' to conduct ozone away from the respective space 1 and 1'. These passages 5,5' and 6,6', respectively, for oxygen gas or gas rich in oxygen and ozone are formed in said metal block 3,3' in such a way, that when the metal blocks are assembled with the rest of the components to an ozone generator, the passages 5 and 5' extend essentially opposite to each other and the passages 6 and 6' opposite to each other, i.e. extending mirror-inverted to each other, whereby oxygen gas or gas rich in oxygen flows into the sealed spaces 1,1' of the ozone generator at mainly the same position in the respective space, and equally from the respective space at mainly the same position.

In some of the known embodiments of ozone generators in which oxygen gas or gas rich in oxygen is conducted into a sealed space centrally located in an ozone generator (see e.g. above-mentioned WO, A1 9701507), the ceramic material, often used as the dielectric material, tends for example to crack due to the overpressure generated between the plates of ceramic material, pressing the plates outwardly against the earthed and cooled electrodes (metal blocks), or the sealings to the sealed space brakes down; glue lines give in etc.

The embodiment according to the present invention of an apparatus for ozone generation with double sealed spaces or chambers 1,1' which are supplied with oxygen gas or gas rich in oxygen from different directions, eliminates the risk for damage on the plates 2,2' of dielectric material due to the pressure differences arisen by the pressurized oxygen gas or gas rich in oxygen and pressure shocks, respectively. This is obtained by applying pressure on the plates 2,2' from two directions simultaneously and by that the plates together with the intermediate electrode 4 being formed pressure compensating so that applied pressure from said different directions compensate, equalize, each other even when they vary for example due to pressure shocks. The plates 2,2' of dielectric material and the intermediate electrode 4 should herewith achieve required support from for example one in a pressure compensation admitting unit further included component which cooperates to said pressure compensation. The plates 2,2' and the intermediate electrode 4 may also give necessary support to each other, e.g. by being joined according to the above to a pressure compensation admitting unit having no inter-space between said components, and wherein the electrode 4, when having the shape of a plate, may be formed solid as in the FIGS. 1 and 2, or alternatively as e.g. a more or less perforated plate. When oxygen gas or gas rich in oxygen is supplied to the spaces 1,1' the plates 2,2' are pressed towards each other. Said embodiment of the apparatus for ozone generation permits supply of oxygen gas or gas rich in oxygen at an overpressure close to 15 bar, resulting in increased efficiency and larger yield. The pressure compensation admitting unit also contributes to the apparatus obtaining a more stabile operation with improved conversion efficiency.

The respective sealed space 1,1' being delimited by a plate 2 and 2', respectively, of dielectric material and by an earthed and cooled electrode 3 and 3', respectively, is also delimited by at least one endless sealing 7, extending between the plates 2 and 2', respectively, and the electrode 3 and 3', respectively, (see FIG. 2). In order to achieve optimal sealing effect, the sealing preferably consists of an O-ring 7 of an elastic material proportionately resistant to ozone, e.g. silicone rubber. The plate 2 and 2', respectively, of dielectric material and the earthed and cooled electrode 3 and 3', respectively, are only by pressure in contact with the sealing and are to a certain extent movable in relation to each other in their longitudinal direction. Suitable arrangements for this are probably known and are therefore not described or shown in more detail here. Alternatively may the sealing 7 be formed in or arranged on any of the respective sealed space 1,1' delimiting parts 2,3 and 2',3', respectively. External of respective sealing 7 is suitably at least one ring 10 of electric non-conducting material, preferably Teflon or a Teflon-like material, arranged to prevent the sealing from moving outwardly due to the pressure in the sealed spaces 1,1' and to prevent a spark-over directing between the electrodes 3 and 3', respectively, and 4 along their edge sections.

As is evident from the above the plates 2,2' function as a dielectric. When the electrode 4 is connected to an alternating current source and the electrodes 3,3' to earth an electric discharge occurs through the plates 2,2'. Suitable voltage on the alternating current is preferably in the interval 6.000–30.000 V, while the frequency of the alternating current preferably is in the interval 2–100 kHz. As a result of the discharge a part of the oxygen in the sealed spaces 1,1' is converted into ozone. The yield may reach about 20 percent by volume of the gas flowing out through the passages 6 from the ozone generator.

The oxygen gas or gas rich in oxygen which is conducted into the sealed spaces 1,1' of the ozone generator at high pressure via the passages 5,5' may be made to flow randomly through the sealed spaces 1,1' towards the outlet passage 6 for ozone (see shown dashed and dotted arrows in FIG. 1) or be directed in winding paths through the spaces. Passages (not shown) for oxygen gas or gas rich in oxygen and ozone may for this purpose be formed in respective sealed space 1,1' and may each be given desired shape for optimal generation of ozone. In the embodiment shown on the drawings in the FIGS. 1 and 2 with two sealed spaces 1,1' these passages are preferably arranged to extend mainly opposite to each other, i.e. mirror-inverted. The pressure on the plates 2,2' of dielectric material from the inflow of oxygen gas or gas rich in oxygen is thereby distributed analogously in the both sealed spaces 1,1' and counteracts itself.

Suitable operating temperature for the plates 2,2' of dielectric material is about 20° C., though higher temperatures are admitted. However about 80% of the supplied electric energy which is converted to heat, must be cooled, which preferably occurs via the earthed and cooled electrodes 3,3', i.e. the metal block with cooling medium or with passages with cooling medium.

With the above described sealed spaces 1,1' for ozone generation, delimited by plates 2,2' of dielectric material, earthed and cooled electrodes 3,3' having smooth surfaces, and also by least one endless sealing 7, the thickness of said spaces may primarily be dependent on the thickness of the sealing around the spaces. If, for some reason, a larger volume of said sealed spaces 1,1' is desired, this may easily be achieved by e.g. providing respective earthed and cooled electrode 3,3' with a recess 8 on the side thereof which delimits such a sealed space. Thus is in the drawings in the FIGS. 1 and 2 shown preferred embodiment of the ozone generating apparatus according to the present invention, respective sealed space 1,1' formed mainly of, and the size thereof is by said recess 8 established to that extent that the main part of the space is delimited by the recess and the main part of the size (thickness) of the space is defined by the depth of the recess.

In order to optimize the generation of ozone it is required that the so called corona-effect which is achieved at the electrical discharge between the electrodes is as uniform as possible, i.e. uniformly distributed over the whole surface where the discharge may occur via a dielectric and in presence of oxygen. For this, in turn, an even distance is required between said dielectric and the earth electrode.

To achieve optimal ozone generation, but also to improve the cooling, one embodiment of the present invention is therefore provided with a corona-effect promoting structure 9, being devised to promote a discharge between the electrodes 3,3' and 4, respectively, and being arranged or formed in the drawn embodiment of FIGS. 1 and 2 in both sealed spaces 1,1' (see preferably FIG. 2). In one embodiment said structure is mainly formed as a net 9. In order to achieve the desired uniform distance the net 9, which preferably is made of stainless steel, is constituted of a separate part located in respective sealed space 1,1' adjacent to the earthed and cooled electrode 3,3', i.e. in the shown embodiment in the recess 8 thereof. Alternatively the net may however be formed directly in the surface (e.g. the bottom of the recess 8) on respective earthed and cooled electrode 3,3', which faces and delimits the sealed space 1 and 1, respectively. The net structure may be formed e.g. by stamping, milling, etching or cutting by means of laser in said surface. An embodiment in which the structure is formed in the surface of the earth electrode implies a simpler construction with less comprising parts in the ozone generator, compared to an embodiment with a separate structure 9.

The above described apparatus for generation of ozone may, if so is desired for further enhanced ozone production, be attached to one or more other apparatuses of the same sort to devices with a manifold of stacks of such apparatus. In order to facilitate such an attachment, but also to admit an alternative embodiment according to the invention, it is with certain modifications of the embodiment shown in the FIGS. 1 and 2 possible e.g. to form one or more of the earthed and cooled electrodes 3,3' with recesses 8 on two opposite sides thereof, and with the corresponding arrangement as the above described of the plates 2,2' of dielectric material and also the electrodes 4 for connection to an alternating current source, on both sides of said earthed and cooled electrodes. When needed or desired, a further plate of dielectric material may thus be arranged on the side of the earthed and cooled electrode 3 or, in the embodiment shown on the drawings in FIGS. 1 and 2, on the other side of it or the earthed and cooled electrodes 3,3', opposing the side(s) which delimit(s) a sealed space 1,1', such that a further sealed space is delimited between respective further plate and the earthed and cooled electrode(s), and as well may a second electrode on which a high frequency alternating current with high voltage is applicable, be arranged on the opposite side of respective further plate of dielectric material as said further sealed space or spaces.

Supports for the plate 2 of dielectric material and the electrode 4 may be required if no further expansion is made.

Furthermore, it should also be noted that the last mentioned further embodiment of the apparatus according to the present invention for ozone generation of course also is possible even without said recesses on both sides of one or more earthed and cooled electrodes.

Figure 3:
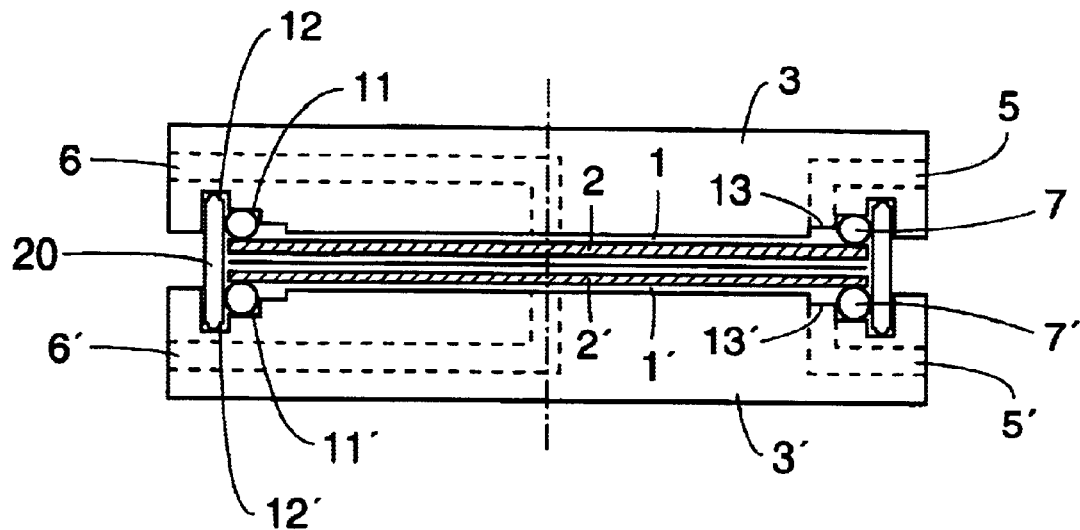
FIG. 3 shows a schematic cross-sectional view of a second preferred embodiment of an ozone generator according to the present invention.
Figure 4:
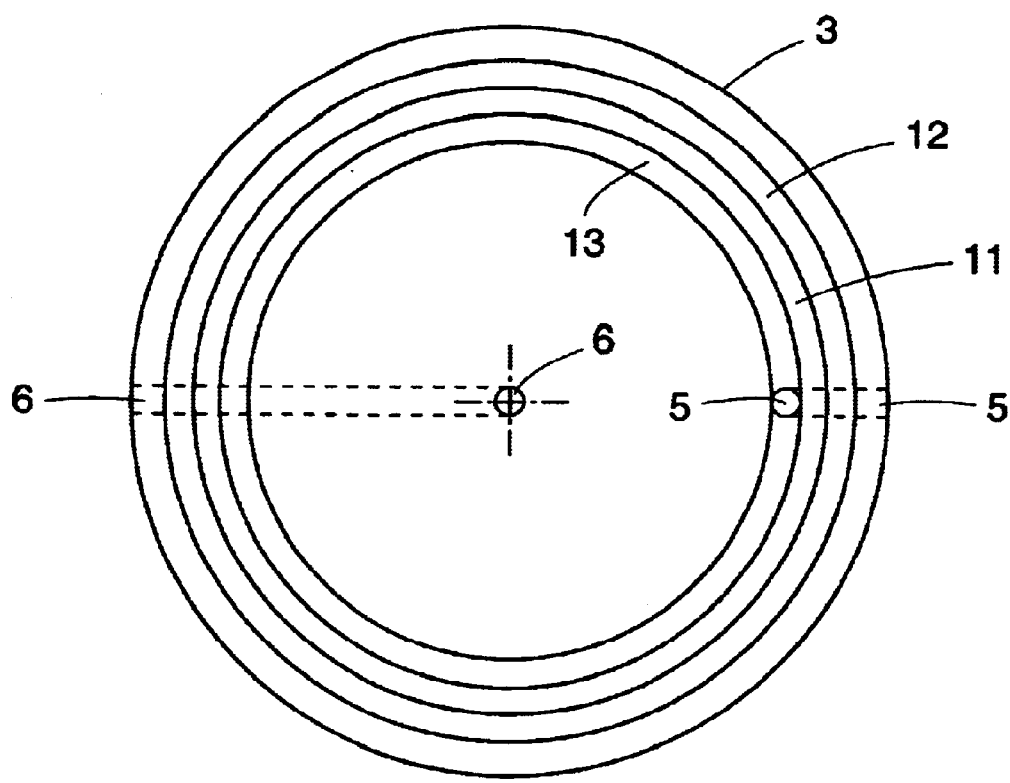
FIG. 4 shows schematically a part of the ozone generator according to FIG. 3, as seen from the inside of its chamber.

In FIGS. 3 and 4 a second preferred embodiment of the invention is shown, which second embodiment in many aspects resembles the first embodiment shown in the FIGS. 1 and 2. Therewith are the reference notations used in FIGS. 3 and 4 the same as those used in FIGS. 1 and 2, where the same or corresponding parts are referred to.

Thus, in FIG. 3, an ozone generator is shown having a high voltage electrode 4 on which a high frequency alternating current with high voltage is applicable. This high voltage electrode is arranged between a first and a second dielectric element 2 and 2', respectively, which dielectric elements 2,2' preferably are mounted directly on said high voltage electrode 4 on opposite sides thereof. In FIG. 3 the respective dielectric element 2 and 2', respectively, is shown at a distance from the high voltage electrode 4 only for the purpose of clearly showing the position of the high voltage electrode 4. The first dielectric element 2 delimits, on its opposite side of the high voltage electrode 4, a chamber 1 adapted for ozone generation from oxygen gas or gas rich in oxygen. A first earthed electrode 3 delimits the first chamber 1 on the opposite side of the chamber 1 of the first dielectric element 2. Correspondingly, the second dielectric element 2' delimits on its opposite side of the high voltage electrode 4, a second chamber 1', which second chamber 1' is uniform with the first chamber 1. A second earth electrode 3' delimits said second chamber 1' on the opposite side of the chamber 1' of said second dielectric element 2'. In the earth electrodes 3 and 3', respectively, inlet passages 5 and 5', respectively, are arranged, adapted for connection to a common source for oxygen gas or gas rich in oxygen. Further, outlet passages 6 and 6', respectively, are arranged in the earth electrodes 3 and 3', respectively, which outlet passages are adapted for outlet of ozone. Each chamber 1 and 1', respectively, is between its delimiting dielectric element 2 and 2', respectively, and earth electrode 3 and 3', respectively, sealed off with an endlessly extending sealing 7 and 7', respectively. For each sealing 7,7' a sealing recess 11 and 11', respectively, is therefor arranged in earth electrode 3 and 3', respectively. Furthermore, a support ring 10 is arranged between said earth electrodes 3,3' outside said sealing 7,7', for which support ring 10 respective earth electrode 3,3' is arranged with an outer recess 12 and 12', respectively.

Said second embodiment shown in FIGS. 3 and 4 differ in a couple of aspects from the first embodiment shown in the FIGS. 1 and 2. For example, the second embodiment is characterized by that internal recesses 13 and 13, respectively, are arranged in respective earth electrode 3,3', endlessly extending immediately inside respective sealing recess 11,11'. These internal recesses 13 and 13', respectively, are thus situated inside the respective chamber 1,1', defining in the respective chamber a periphery section having a larger depth than in the respective central section of the chamber.

As is clearly evident from the FIGS. 3 and 4 said inlet passages 5 and 5', respectively, emerge in the respective chamber 1,1' in these internal recesses 13 and 13', respectively. With this arrangement the gas, preferably oxygen gas, which is supplied to the chambers 1,1' is brought to first fill said internal recesses 13 and 13', respectively, as the flow resistance is less in the relatively deeper recesses 13,13' than inwardly the relatively more shallow central section of the respective chamber 1,1'. Since the gas not until thereafter will flow inwardly towards the respective outlet passage 6,6' arranged in the center of respective chamber 1,1', more or less from the entire periphery of the chamber, a uniform pressure distribution over the chamber is achieved. Moreover, fresh gas will continuously be supplied into respective recess 13,13' and thereby form a barrier between the respective sealing 7,7' and ozone generated in respective chamber 1,1', which ozone tends to flow towards the respective outlet passage 6,6' of the chamber. This barrier effect is particularly advantageous since the highly reactive features of the ozone otherwise means a risk for the sealings 7,7' to break down. The arrangement with the adjacent to the sealing extending internal recess, and with the inlet passage emerging in said recess and the outlet passage emerging in the center of the chamber, thus guarantees an increased resistance and useful life for the product.

Another feature characterizing the embodiment shown in the FIGS. 3 and 4 is the circular shape, which is illustrated in FIG. 4. In this figure the earth electrode 3 is shown from the side facing the chamber 1. It is clearly evident where the inlet passage 5 and the outlet passage 6 emerge, and that the different recesses 11,12,13 of the earth electrode 3 form a manifold of concentric circles in the periphery of the earth electrode. The circular shape is advantageous since the supplied gas, which first fills the internal recess 13, afterwards has an equally long distance to flow to the outlet passage 6, which further results in a uniform pressure distribution over the chamber 1. The lack of corners following the circular shape is also advantageous at high gas pressure.

The recesses 13,13' which are adapted to protect the sealings 7,7' against the ozone may of course be realized in ozone generators with a different shape than circular, for example as the one shown in FIG. 1.

In agreement with the embodiment shown in the FIGS. 1 and 2 the earth electrodes 3,3' may be arranged with a corona-effect promoting structures, for example net patterns arranged in the surfaces of the earth electrodes 3,3' facing the respective chamber 1,1'. Also other earlier discussed features of the first embodiment are of course applicable also on the second embodiment. This applies for example to the design of the high voltage electrode 4 and the dielectric elements 2, 2', the cooling of the earth electrodes 3,3', and also for the embodiment with double-sided earth electrodes 3,3', which are arranged to delimit further gas chambers.

FIG. 5 illustrates a third embodiment of the present invention, comprising all features depicted in FIG. 3. Therefore, for the purpose of making the drawing easy to understand, references to elements previously made in FIG. 3 have been left out in FIG. 5. In addition to the embodiment of FIG. 3, FIG. 5 clearly shows passages 50,56,57 arranged in the earth electrodes 3 and 3'. The cooling arrangement for the two earth electrodes 3 and 3' are preferably equally though inversely formed, as shown, therefore only the cooling arrangement of earth electrode 3 is described. An inlet for a cooling fluid, preferably water or containing water, is provided at the side of the earth electrode 3, in the drawing indicated by $H_2O$ and an arrow pointing towards the ozone generator. The cooling fluid inlet leads, via a cooling fluid inlet passage 56, to a cooling fluid chamber 50. In the illustrated embodiment, this cooling fluid chamber is formed by a recess in the earth electrode 3, on the side of the earth electrode 3 facing away from the corona chamber 1. A closing cover 51 is arranged to fit over the recess, and to leave a cooling gap between the opposing sides of the earth electrode 3 and the cover 51 when closed. In the illustrated embodiment the cover 51 is terraced at its periphery in order to fit properly into the recess. Preferably, and as illustrated, a removable sealing such as an o-ring 55 is provided between the earth electrode 3 and the cover 51. Fastening means 52,53, preferably removable fastening means, such as screws nuts or bolts, are used to fasten the closing cover 51 onto the earth electrode 3. In the illustrated embodiment of FIG. 5 the fastening of the cover 51 is accomplished by cover screws 52 running through apertures 54 in the cover 51 and into matching screw holes in the earth electrode 3. A cooling fluid outlet passage 57 leads away from the cooling chamber 51 to a cooling fluid outlet, indicated by the arrow at H₂O pointing away from the earth electrode 3.

By the cooling arrangement according to the invention, a cooling fluid can be flushed through the earth electrode 3 in order to cool the apparatus during operation. The center electrode 4 has very little mass, compared to each earth electrode 3,3', and will not absorb as much heat. Furthermore, since it is arranged in between the earth electrodes 3,3' and with only a very small corona gap 1,1' separating the high voltage electrode 4 from the earth electrodes 3,3', any heat generated in the corona gap will be effectively transferred to the earth electrodes and transported away by the cooling fluid flowing through the cooling fluid passages 56,51,57.

Figure 6:
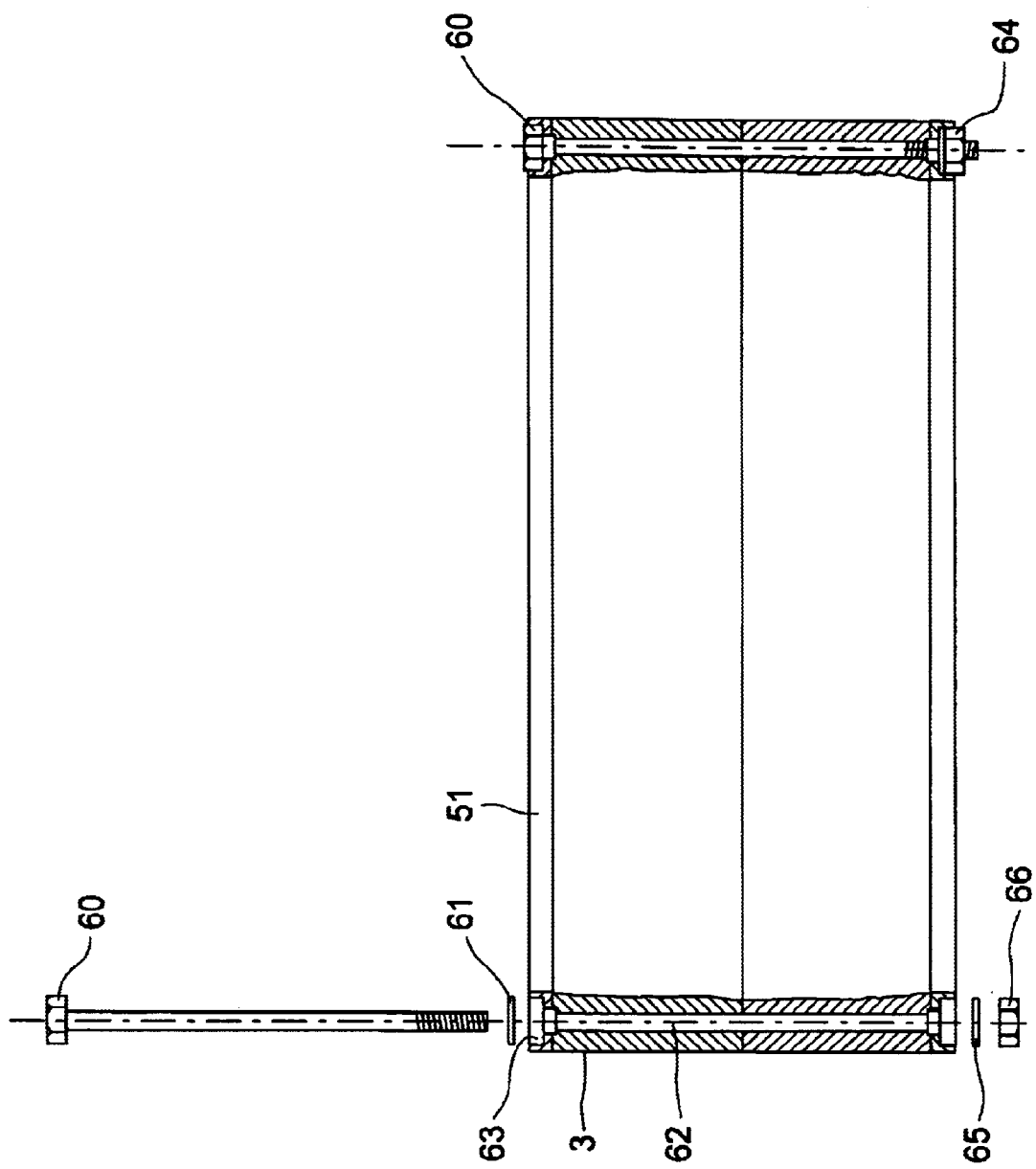
FIG. 6 shows the embodiment of FIG. 5 partly in cross-section, illustrating how the apparatus is assembled.

FIG. 6 illustrates a side view of the embodiment of the present invention from FIG. 5. The outermost parts of the double cell ozone generator are shown in cross-section, in order to reveal a bore 62, extending all the way through both earth electrodes 3,3' and both covers 51. An assembly bolt or screw 60 with a nut 66 is preferably used to assemble the earth electrodes 3,3', and thus also the packet comprising the dielectrics 2,2' and the center electrode 4, arranged between the earth electrodes 3,3'. Preferably the bore 62 displays a shoulder 63 at its outer ends, devised to receive the nut and the head of the screw, respectively. One or more cup springs 61,65 may be arranged around the screw 60, in order to exert a certain desired force for holding the assembled apparatus together. The cuts of the cross-sections in FIGS. 5 and 6 are taken through different diagonals of the apparatus. Consequently, cover screws 52 and assembly screws 60 are distributed along the circumference of the ozone generator according to the present invention.

The embodiment in FIG. 3 of the invention is, as the one in FIG. 2, designed to decrease stresses on the dielectric elements 2, stresses that primarily are due to gas pressure variations in a gas supply system which is connected to the ozone generator to supply oxygen gas or gas rich in oxygen to the inlet passages 5,5'. The solution is based on one of the basic principles in physics, namely that such stresses may be decreased or eliminated by a construction allowing pressure compensation. According to the embodiments shown in the figures is this pressure compensation realized by letting oxygen gas or gas rich in oxygen under pressure be conducted from a common source into two uniform sealed chambers 1,1', and that these chambers in between themselves are delimited by a unit comprising two dielectric elements 2,2' and between them a high voltage electrode 4. Pressure variations originating from the gas supply system will thus generate equal pressure changes in the two opposite chambers 1,1', whereby no resulting force arises, acting on the unit located between the chambers.

Due to the opposite chambers being arranged with their respective inlet passages 5,5' and outlet passages 6,6' on corresponding position on opposites sides of said unit, an ozone generator which is comparatively insensitive to high supplied pressure is also obtained.

For a suitable connection of the ozone generator to a gas supply system the inlet passages 5,5' are preferably arranged on the same side, as is shown in FIG. 3. A larger ozone generator system may easily be built of a stack of ozone generators according to the second embodiment mounted in a pile, since both inlet passages and outlet passages are accessible from the sides of the earth electrodes 3,3'.

In an alternative embodiment, not shown in the figures, the ozone generator comprises a unit with a first and a second side, and which at least partly is perforated and thereby permeable for gas from said first side to said second side. The unit comprises a high voltage electrode, which is coated with a dielectric material. Preferably comprises the unit a net structure including a high voltage electrode coated with a dielectric material. In the ozone generator the unit is arranged in a chamber, which chamber at least partly is delimited by an earth electrode. The dielectric material delimits the high voltage electrode from the chamber, but due to the permeability for gas of the unit gas pressure variation arising in said chamber are able to propagate to both sides of said unit, whereby no resulting force acting on the sides of the unit arises. The chamber may be arranged with two opposite earth electrodes with the unit located in the chamber between said earth electrodes. The chamber is arranged with an inlet passage for gas, preferably oxygen gas or gas rich in oxygen, and an outlet passage, preferably ozone bearing gas. In an embodiment two inlet passages to the chamber may be arranged, one on each side of said unit, as well as two outlet passages on each side of said unit.

In a further embodiment of the invention, comprising a chamber for conversion of oxygen gas or gas rich in oxygen to ozone, the delimiting surfaces of the chamber are constituted of concentric tubes with a common axis instead of plates, whereby the chamber also is tubular. The internal tubular delimiting surface of the chamber comprises a first tubular dielectric material according to the teachings of the prior art. A high voltage electrode is arranged adjacent to the first dielectric element on the opposite side of said chamber, i.e. arranged at the inside of the dielectric tube.

In a first variant of this embodiment the high voltage electrode engages, on the opposite side of the first dielectric tube, a second tubular dielectric element. This second tubular dielectric element delimits in its turn, on its inside, a second chamber. The respective chamber is, on the opposite side of the respective delimiting dielectric tube, delimited by an earthed metal tube. Furthermore, the ozone generator is arranged with each one inlet passage to the respective chamber, which inlet passages are arranged to be connected to a common gas supply system for supply of oxygen gas or gas rich in oxygen to the respective chamber. The ozone generator thus comprises a series of concentric tubes, in which the two dielectric elements and the electrode located between them constitutes a unit. With the described arrangement pressure variations originating from the gas supply system connected to the ozone generator will influence said unit both from its inside and outside.

In a second variant of the tubular embodiment the tubular unit is constituted of a gas permeable high voltage electrode which is coated with a dielectric material, whereby the unit preferably forms a tubular net structure with an outside and an inside. The unit is arranged in the tubular chamber, and the permeable features of the net structure brings about that a generated pressure change on one side of the unit generates a corresponding pressure change on its opposite side.

In the tubular embodiment of the invention said unit is, in each end of the ozone generator, preferably sealed towards the earthed metal tubes with interposed O-rings. In each end of the respective earthed metal tube a recess is preferably formed, extending in the chamber adjacent to the O-ring devised to seal off the chamber towards the opposing dielectric tube element. In this recess, which forms a deepened section of the chamber, said inlet passage preferably emerges, while said outlet passage preferably emerges centrally on the earthed metal tube. This arrangement causes supplied oxygen gas or gas rich in oxygen first to fill said recess, thereby protecting the adjacent O-ring against ozone generated in the chamber.

For those skilled in the art is it evident from above that the apparatus according to the present invention may be modified and changed within the frame of the following claims without departing from the idea and the purpose of the invention.

What is claimed is:

1. A flat plate ozone generator comprising a high voltage electrode, located centrally between two uniform corona chambers, wherein each chamber on one side is delimited from said high voltage electrode by a dielectric and opposite said dielectric by each one second electrode, wherein each of said second electrodes is an earth electrode constituted by a metal block separately delimiting one of said chambers towards the opposing dielectric, wherein a gas inlet passage and a gas outlet passage to the delimited chamber is formed in each metal block.

2. The ozone generator according to claim 1, wherein each sealed chamber is delimited by least one endlessly, between the dielectric element and the earth electrode, extending sealing member.

3. The ozone generator according to claim 2, wherein said sealing member is constituted of an O-ring.

4. The ozone generator according to claim 2, wherein said high voltage electrode and said dielectric elements are composed of substantially flat bodies.

5. The ozone generator according to claim 4, wherein the high voltage electrode is arranged in direct contact with the dielectrics thereby forming a substantially flat packet, which packet is held in place by said earth electrodes exerting pressure on said sealing members.

6. The ozone generator according to claim 2, wherein a recess is arranged in the respective earth electrode endlessly extending inside the respective chamber adjacent said sealing member, in which recess said inlet passages emerge.

7. The ozone generator according to claim 2, wherein a ring of an electrically isolating material is arranged externally of the respective sealing member to protect against spark-over external of the respective chamber.

8. The ozone generator according to claim 2, wherein said sealing member extends in an annular shape between the respective dielectric element and earth electrode, thereby delimiting said respective chamber to a shape of circular discs.

9. The ozone generator according to claim 2, wherein for the respective chamber said inlet passage emerges in the periphery part of the chamber, close to said sealing member, and wherein said outlet passage emerges centrally in the chamber.

10. The ozone generator according to claim 9, wherein a recess is formed in said earth electrode in the periphery part of the chamber, extending in a ring concentrically inside said sealing member, in which recess said inlet passage emerges.

11. The ozone generator according to claim 1, wherein the high voltage electrode is formed or arranged as a metallic coating on one or both of the dielectric elements.

12. The ozone generator according claim 1, wherein the high voltage electrode is composed of a metal foil or metal sheet.

13. The ozone generator according to claim 1, wherein respective sealed chamber is partly formed by a shaped recess in the respective earth electrode.

14. The ozone generator according to claim 1, wherein flow control passages for oxygen gas or gas rich in oxygen and ozone are formed in the inside of respective sealed chamber, adapted to conduct the gas flow in predetermined directions in said chamber.

15. The ozone generator according claim 1, comprising a structure arranged or formed in the respective sealed chamber, which structure is formed to promote the forming of a corona-effect at discharge between the high voltage electrode, by the dielectric, to the earth electrode in respective chamber.

16. The ozone generator according to claim 15, wherein said structure is formed mainly as a net.

17. The ozone generator according to claim 15, wherein the structure is composed of a separate part arranged in respective sealed chamber.

18. The ozone generator according to claim 15, wherein the structure in the respective sealed chamber is a pattern formed in the respective earth electrode.

19. The ozone generator according to claim 1, wherein a passage for a cooling fluid for cooling the earth electrode is formed in each metal block.

20. A flat plate ozone generator comprising a flat high voltage electrode, located centrally between two uniform corona chambers, wherein each chamber on one side is delimited from said high voltage electrode by a dielectric and opposite said dielectric by each one second electrode, wherein each of said second electrodes is an earth electrode constituted by a metal block having a substantially flat surface separately delimiting one of said chambers towards a surface of the opposing dielectric, wherein the high voltage electrode is arranged in direct contact with the dielectrics forming a substantially flat packet, and an endless O-ring sealing member is provided in each chamber interposed between the facing surfaces of the dielectric and the earth electrode, which packet is held in place by said earth electrodes exerting pressure on said sealing members.

21. The ozone generator according to claim 20, wherein a gas inlet passage and a gas outlet passage to the delimited chamber is formed in each metal block, and wherein a recess is formed in the substantially flat surface of each earth electrode in a periphery part of the respective chamber, endlessly extending adjacent said sealing member, in which recess said inlet passage to said chamber emerges, such that the chambers show a larger depth in said recess than in their central part.

22. A flat plate ozone generator comprising a high voltage electrode and a dielectric formed as substantially flat bodies, which dielectric delimits a sealed chamber towards a substantially flat opposite surface of a second electrode, wherein said second electrode is an earth electrode constituted by a metal block fixed at a predetermined distance from the dielectric by an interposed endless sealing member, wherein a gas inlet passage and a gas outlet passage to the delimited chamber is formed in each metal block, and wherein a recess is formed in the substantially flat surface of each earth electrode in a periphery part of the respective chamber, endlessly extending adjacent said sealing member, in which recess said inlet passage to said chamber emerges, such that the chambers show a larger depth in said recess than in their central part.

23. A flat plate ozone generator comprising:
　a high voltage electrode packet, including
　　a flat high voltage electrode metal element having a first side and a second side;
　　a first flat dielectric element arranged adjacent and parallel to the first side of said high voltage electrode, and having a first plane dielectric surface facing away from said high voltage electrode;
　　a second flat dielectric element arranged adjacent and parallel to the second side of said high voltage electrode, and having a second plane dielectric surface facing away from said high voltage electrode and said first dielectric surface;

a first earth electrode formed of a first metal block, and having a first plane earth electrode surface facing said first dielectric surface;

a second earth electrode formed of a second metal block, and having a second plane earth electrode surface facing said second dielectric surface;

a first endless sealing member arranged between and in contact with the first dielectric member and the first earth electrode, such that a first corona chamber is delimited by said first dielectric surface, said first earth electrode surface and said first endless sealing member;

a second endless sealing member arranged between and in contact with the second dielectric member and the second earth electrode, such that a second corona chamber is delimited by said second dielectric surface, said second earth electrode surface and said second endless sealing member;

a first gas inlet passage to and a first gas outlet passage from said first corona chamber, formed in said first metal block;

a second gas inlet passage to and a second gas outlet passage from said second corona chamber, formed in said second metal block.

24. The ozone generator according to claim 23, wherein said packet is held in place by said first earth electrode exerting pressure on said first sealing member towards said first dielectric surface, and said second earth electrode exerting pressure on said second sealing member towards said second dielectric surface.

* * * * *